(12) United States Patent
Taylor

(10) Patent No.: US 7,188,540 B2
(45) Date of Patent: Mar. 13, 2007

(54) METHOD AND APPARATUS FOR CONTROLLING A TRANSMISSION OF A VEHICLE

(75) Inventor: Richard Taylor, Stretton-Under-Fosse (GB)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/235,752

(22) Filed: Sep. 27, 2005

(65) Prior Publication Data
US 2006/0011007 A1 Jan. 19, 2006

Related U.S. Application Data

(63) Continuation of application No. PCT/GB2004/001245, filed on Mar. 24, 2004.

(30) Foreign Application Priority Data
Mar. 27, 2003 (GB) ................... 0307119.8

(51) Int. Cl.
*F16H 59/00* (2006.01)

(52) U.S. Cl. .................. 74/335; 74/473.11; 74/473.12

(58) Field of Classification Search ................. 74/335, 74/473.11, 473.12; 475/120, 121, 122, 123, 475/132
See application file for complete search history.

(56) References Cited

U.S. PATENT DOCUMENTS

| 3,834,499 A | | 9/1974 | Candellero et al. |
| 4,068,537 A | * | 1/1978 | Wolfe ...................... 74/473.11 |
| 5,836,207 A | * | 11/1998 | Spooner et al. ............... 74/335 |
| 6,755,091 B2 | * | 6/2004 | Adomeit et al. .............. 74/335 |

FOREIGN PATENT DOCUMENTS

| GB | 2 071 794 A | | 9/1981 | |
| GB | 2 163 224 A | | 2/1986 | |
| GB | 2 378 489 A | | 2/2003 | |
| JP | 6-221427 | * | 8/1994 | ................. 74/335 |

* cited by examiner

*Primary Examiner*—Ha Ho

(57) ABSTRACT

The movement of a shift rail in an automatic gear transmission system, wherein each shift rail is connected to an associated actuator, is controlled with an electrical control signal. When a first electrical control signal is sent to a first of the actuators to actuate the first of the actuators, a second electrical control signal is sent to the other actuator(s) to cause the other actuator(s) to be locked in position.

4 Claims, 4 Drawing Sheets

METHOD AND APPARATUS FOR CONTROLLING A TRANSMISSION OF A VEHICLE

CROSS-REFERENCE TO RELATED APPLICATIONS

This is a continuing application, under 35 U.S.C. § 120, of international application PCT/GB2004/001245, filed Mar. 24, 2004, which designated the United States; this application also claims the priority, under 35 U.S.C. § 119, of British patent application GB 0307119.8, filed Mar. 27, 2003; both prior applications are herewith incorporated by reference in their entirety.

BACKGROUND OF THE INVENTION

Field of the Invention

The invention relates to a drive transmission of a motor vehicle, in particular a drive transmission comprising shift rails which are hydraulically actuated, and a method of operating such a transmission.

One known form of drive transmission is a dual clutch transmission such as the DSG transmission used in the Audi TT. A typical dual clutch transmission is shown schematically in FIG. 1. In a vehicle system, an output drive from an engine 12 is coupled to the wheels via a dual clutch transmission designated generally with numeral 14. The transmission 14 includes first and second clutches 18 and 20 and respective first and second input shafts 22 and 24. The input shafts 22 and 24 carry respective first and second gear sets 26 and 28. In the embodiment shown the first gear set 26 carries gears "1", "3", "5" and "7" (designated schematically) and the second gear set 28 carries gears "reverse", "2", "4" and "6" (designated schematically). A gear of either or both gear sets 26, 28 is selectively engagable with a corresponding gear of an output gear set 30 on an output shaft 32 which is coupled to the vehicle wheels by an appropriate intermediate linkage. It will be appreciated that the illustrated configuration is simplified and in practice the systems may be more complex, although they operate on the same principle. For example the clutches 18, 20 can be mounted co-axially.

In operation, where the vehicle is for example in fifth gear, the first clutch 18 is fully engaged with the engine 12, with the relevant gear of gear set 26 engaging the relevant gear of gear set 30 on the output shaft 32. The second clutch 20 is fully disengaged from the engine 12 but can be engaged with the output shaft 32 by means of a gear in the gear set 28 and the second input shaft 24. If a gear shift is required (for example to fourth gear) and the required gear on the second input shaft 24 is not already engaged with the output shaft 32, then with the second clutch 20 remaining disengaged from the engine, the appropriate gear of the second gear set 28 is synchronized with the relevant gear of the output gear set 30 and then engaged such that clutch 20 spins freely and not in synchronization with the engine speed. In the downshift from fifth to fourth gear, the second clutch 20 will typically be rotating faster than the engine speed and so, to synchronize the engine speed with the speed of the second clutch 20, the first clutch 18 is disengaged until slipping starts at which point the engine speed rises. As the engine speed approaches the second clutch speed the second clutch 20 is engaged and the first clutch 18 disengaged.

As explained with reference to FIG. 1, an input shaft 22, 24 is provided for each gear set 26, 28. A shift rail 34 is provided to shift a selector fork 36 between a neutral position and an engaged position in which a synchronizer clutch 38 is moved into engagement with a gear on an input shaft, which is itself already in engagement with a gear of the output gear set 30. To move a selector fork 36, hydraulic fluid is passed through conduits to actuate an associated actuator 40 connected to the shift rail 34 and hence cause the associated selector fork 36 to move as required and the associated synchronizer clutch 38 to move into engagement with a gear on an input shaft.

Typically, hydraulic systems are used to actuate the displacement of the shift rails and each hydraulic circuit is controlled by an electric solenoid.

SUMMARY OF THE INVENTION

It is accordingly an object of the invention to provide an apparatus and a method for controlling a vehicle transmission which overcomes the above-mentioned disadvantages of the heretofore-known devices and methods of this general type and which provides for more accurate, dependable, and swift control of the automatic or automated manual gear transmission. Accidental actuation of the actuator should be safely prevented.

With the foregoing and other objects in view there is provided, in accordance with the invention, an apparatus for controlling a movement of a shift rail in an automatic gear transmission system, the apparatus comprising:

a plurality of actuators each connected to an associated shift rail, the plurality of actuators including a first actuator and one or more remaining actuators; and a control device connected to the actuators for controlling the actuators with an electrical control signal, the control device being configured, when a first electrical control signal is sent to the first actuator for actuating the first actuator, to send a second electrical control signal to the one or more remaining actuators to cause the remaining actuators to be locked in position.

In accordance with an added feature of the invention, the actuator is a hydraulic valve-controlled actuator. In a preferred embodiment, the actuator is hydraulically locked in response to the electrical control signal being applied to a control input of the hydraulic valve. The control valve according to the invention is configured to effectively provide substantially zero flow when the electrical control signal is applied.

With the above and other objects in view there is also provided, in accordance with the invention, a method of controlling a movement of a shift rail in an automatic gear transmission system, wherein each shift rail is connected to an associated actuator. The method comprises the following method steps:

controlling an actuation of an actuator with an electrical control signal, and, when a first electrical control signal is sent to a first of the actuators to actuate the first of the actuators, sending a second electrical control signal to the remaining actuators to cause the remaining actuators to be locked in position.

In other words, the invention provides for a method of controlling the movement of a shift rail in an automatic gear transmission. An actuator is locked owing to the applied control signal and accidental actuation of the actuator is prevented.

Other features which are considered as characteristic for the invention are set forth in the appended claims.

Although the invention is illustrated and described herein as embodied in a method of controlling a vehicle transmission, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
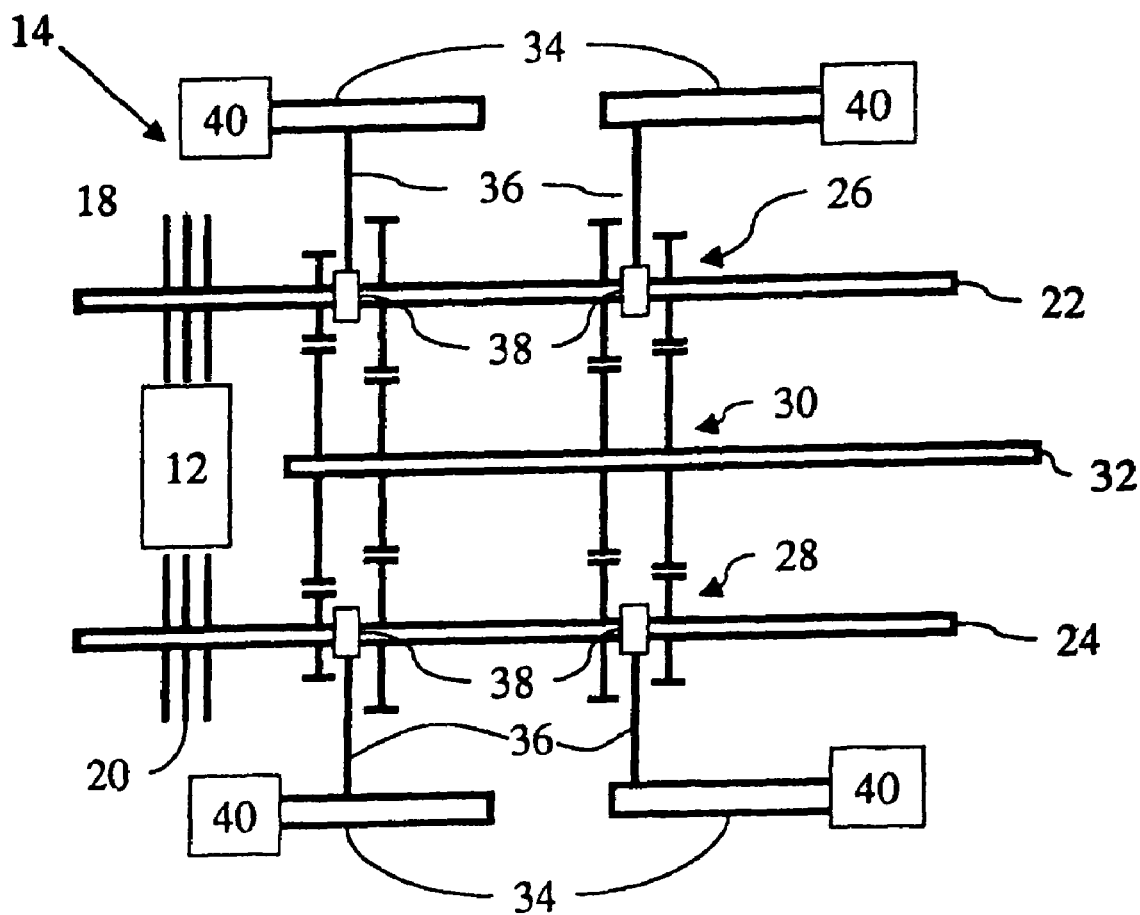
FIG. 1 is a schematic diagram of a prior art dual clutch transmission.

A vehicle typically has a plurality of gears including reverse and typically at least four forward gears: first, second, third and fourth. In the embodiment to be described, an eight speed gear box will be described which provides gears as follows: reverse, 1, 2, 3, 4, 5, 6, 7.

Referring now once more to the figures of the drawing in detail, there is seen a transmission system where different sets of gears are locked and unlocked to an output shaft to achieve the various gear ratios required. Locking and unlocking of the gears is performed by actuating a selector fork 36. To move the selector fork 36, hydraulic fluid is passed through conduits to actuate an actuator 40 and hence cause the selector fork 36 to move as required. Each selector fork 36 is controlled by a double acting actuator 40 (shown in more detail as actuators 402, 404, 406, 408 in FIG. 2) with pistons that are mechanically connected to the shift rails 34 within the transmission. The rails 34 support the gear selection forks 36 for the movement of splined selector rings 38 to lock and unlock the gears. The shift rails and actuators are arranged such that when the actuator pistons are energized in the neutral position, the actuator will be equidistant from both gears on the rail, with neither gear locked. The position of the selection forks is monitored via a linear displacement sensor, which forms the feedback loop to the control system.

Figure 2:
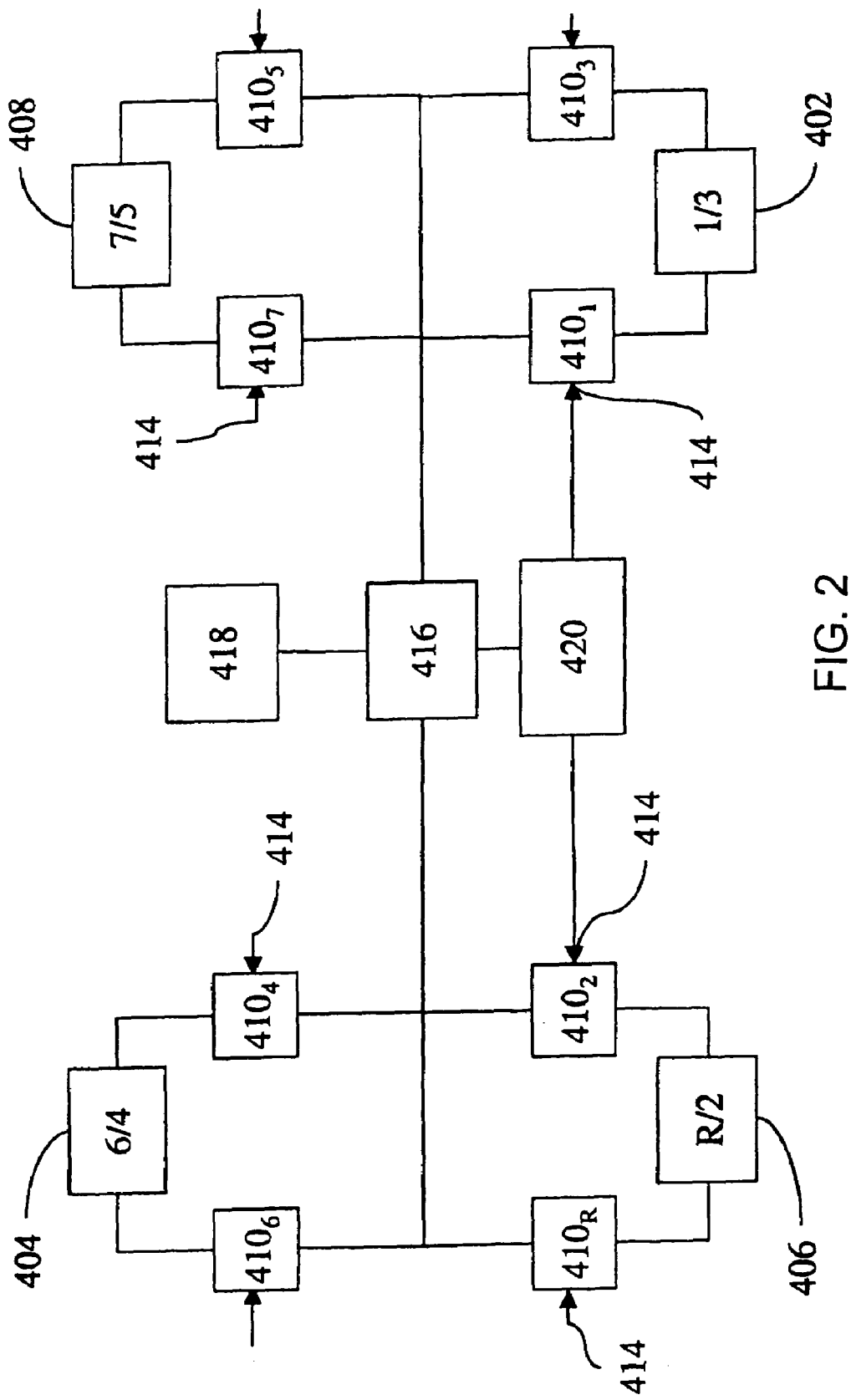
FIG. 2 is a schematic diagram of a hydraulic control system for controlling the movement of a gear in accordance with the invention.

FIG. 2 is a schematic diagram of circuitry according to the invention used to control movement of a shift rail. The embodiment shown in FIG. 2 has eight gears: reverse, first, second, third, fourth, fifth, sixth, and seventh. These are provided in pairs. In the embodiment shown, the following gear pairs are provided: an actuator 402 for the first and third gear; an actuator 404 for the fourth and sixth; an actuator 406 for the reverse and second; and an actuator 408 for the fifth and seventh.

Each actuator has a pair of flow control valves 410 associated with it. In FIG. 2, numeral $410_1$ indicates the flow control valve associated with the "into gear" side of the first gear, $410_2$ indicates the flow control valve associated with the "into gear" side of the second gear, and so on. That is, the subscripts pertain to the gears. The valves 410 typically take the form of electrically actuated hydraulic spool valves. The pressure and flow of the hydraulic fluid entering and exiting the valves 410 control the force and speed respectively with which the associated actuator is moved. The direction of movement of the actuator is dependent upon the controlled direction of fluid flow through the relevant pair of flow control valves 410.

The valves 410 are supplied with hydraulic fluid by a pressure control valve 416 and controlled by a flow control input 414. The pressure control valve 416 regulates the pressure of the hydraulic fluid supplied to the valves 410. The control input 414 of each flow control valve 410 controls the rate of flow of hydraulic fluid into the chamber of the actuator. The flow control valves 410 and pressure control valve 416 are themselves controlled by a control device 420 such as a microprocessor. (For simplicity, some of the flow control inputs 414 of the flow control valves 410 are shown un-connected to control device 420 although in practice they will be connected.) The control device 420 may also be used to control other features of the transmission or vehicle as a whole.

Gear change is controlled by the control device 420. The control device 420 may decide that a gear change is needed in response to a number of factors, such as, for instance, engine speed (rpm), engine torque, terrain, etc.

Figure 3:
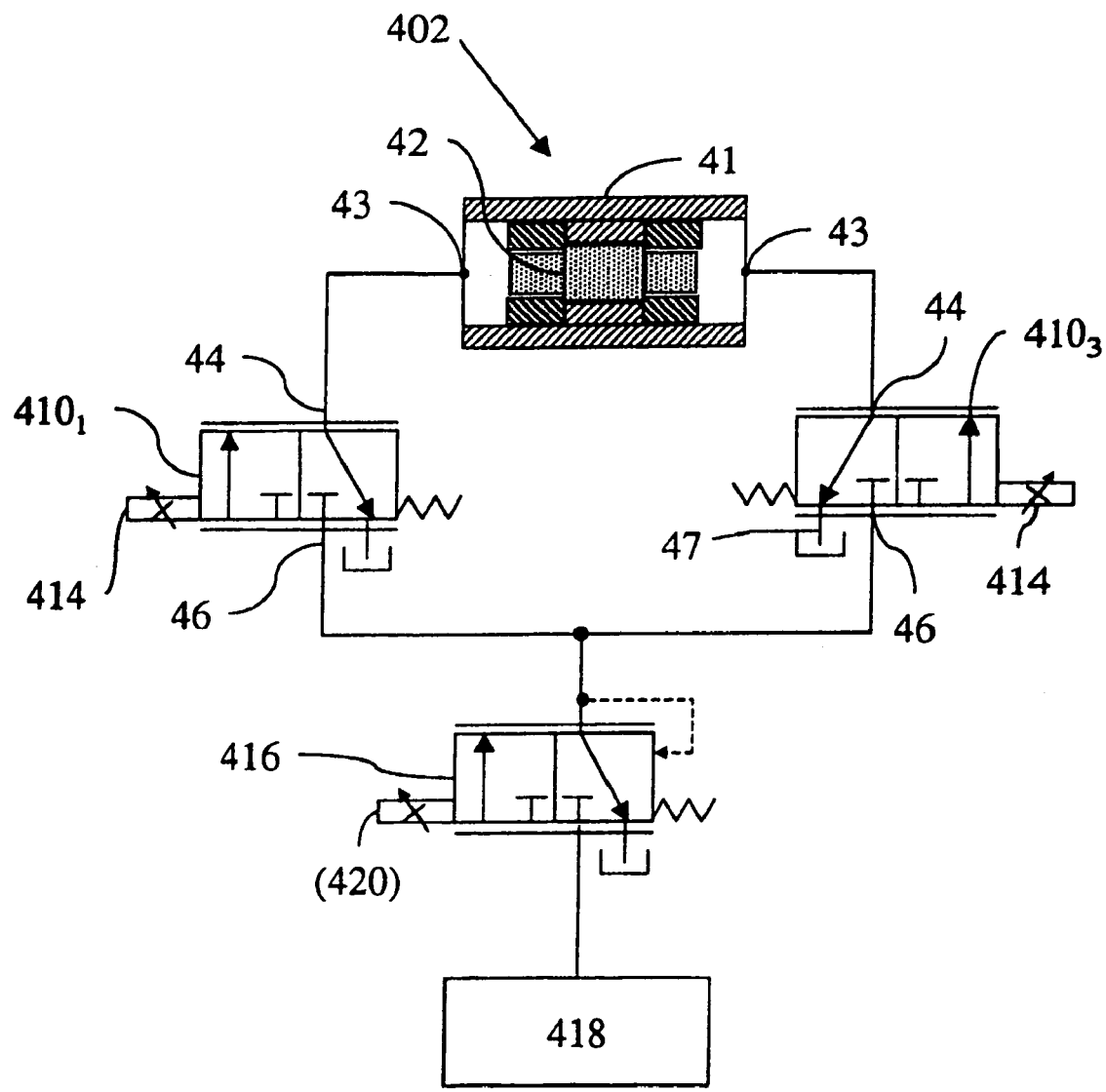
FIG. 3 is a more detailed schematic diagram of the hydraulic control system of FIG. 2.

FIG. 3 shows the actuator configuration in more detail. Only one actuator 402 is shown, however it will be appreciated that the other actuators 404, 406, 408 are arranged in a similar manner. Each actuator comprises an actuator body 41 and an actuating member 42 in the form of a piston. The piston is connected to a shift rail 34. The actuators shown are double-acting actuators i.e. they have openings 43 at opposite ends of the actuator body 41 for fluid to enter and exit the actuator body, one on the left and one on the right as shown in FIG. 3. To enable the gear actuating member 42 to be moved, a proportional 3 way/2 position flow control solenoid spool valve 410 is connected, via a control port 44, to each opening 43 of the actuator 402, 404, 406, 408. Each supply pressure port 46 of the flow control valves 410 is connected to the control port of a proportional 3 way/2 position pressure control solenoid spool valve 416.

The supply pressure port of this valve 416 is connected to a hydraulic supply 418, consisting of a pump and an accumulator. The electrical control input 414 of each flow control valve 410 is connected to the microprocessor 420.

The proportional flow control valves 410 regulate the flow rate of the fluid from the control port 44 to the drain port 47 (when on the "drain" side of the actuator), or the pressure port 46 to the control port 44 (when on the "into gear" side of the actuator) in relation to the current applied to the solenoid of the valve 410. This affects the velocity and direction of movement of the actuating member 42. The fluid is typically oil although other liquids or gases may be used.

The proportional pressure control valve 416 regulates the pressure of the fluid at its control port (and hence the pressure at the pressure port 46 of the flow control valves 410) in relation to the current applied to the solenoid of the pressure control valve 416. This affects the force applied to the actuating member 42.

To enable movement of the gear selector actuator each of the valves 410,416 are operated in a suitable manner to achieve the desired velocity and force. This is achieved by use of the flow control valves 410 to determine the direction of movement of the actuator while the pressure control valve 416 regulates the supply pressure and hence the force generated by the actuator piston. The velocity of the actuator can be regulated by use of the flow control valve on the drain side of the actuator controlling the flow between its control and tank ports.

To enable swift selection (locking) of a synchronized gear in the transmission, the actuating member 42 (and hence the selection rail) is moved from the neutral position (i.e. both gears disengaged), towards the gear by placing the flow control valve 410 on the 'into gear' side of the actuator in a state where it commands maximum flow from its pressure to control ports, and the flow control valve 410 on the 'drain' side of the actuator in a state where it can regulate the flow out of the actuator by controlling flow between its control and tank ports.

To move a synchronizer clutch 38 of the first or second gear set (26, 28 respectively) into engagement with a gear of the gear set, the appropriate actuator is actuated. This causes the associated shift rail 34 to move and hence the selector fork 36 and the associated synchronizer clutch 38 to be moved.

When the control device 420 decides that a gear change is required and which gear is to be engaged, the control device 420 sends a signal to the appropriate pressure control valve 416. This in turn supplies a controlled pressure supply to the appropriate flow control valve 410 and hence the pressure of the fluid applied to the associated actuator. A control signal is also sent from the control device 420 to the control input 414 of the flow control device 410 to control the flow rate of the hydraulic fluid through the valve 410 and hence into, or out of, the associated actuator.

This may be illustrated by considering the example of selecting third gear.

When the control device 420 decides that a selection of third gear is required, the control device 420 sends a control signal to the pressure control valve 416 and the control inputs 414 of the flow control valves 410 associated with the actuator 402 for the third gear. In response, the pressure control valve 416 sets the pressure of the hydraulic fluid applied to the flow control valves $410_1$, $410_3$ for the third gear and the flow control devices $410_1$, $410_3$ sets the flow of the hydraulic fluid into and out of the actuator 402 for the selection of third gear.

Figure 4:
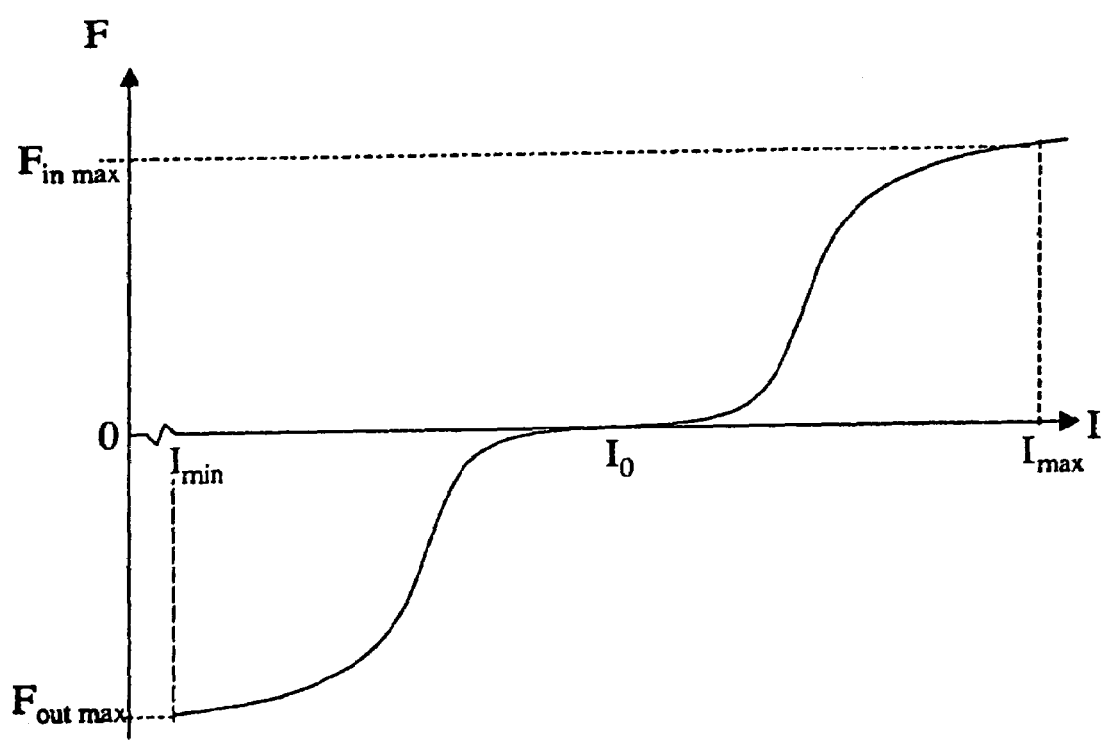
FIG. 4 is a graph plotting flow versus current profile for a hydraulic valve used to control the flow of hydraulic fluid to/from a hydraulic actuator in accordance with the invention.

FIG. 4 shows a flow versus current profile for the valves 410. The current I is the current applied to the control inputs 414 of the flow control valves 410.

When maximum current $I_{max}$ is applied to the control input 414 of the valve 410, maximum flow $F_{in\_max}$ from the pressure port 46 to the control port 44 is allowed. Conversely, when minimum current $I_{min}$ is applied to the control input 414 of the valve 410, maximum flow $F_{out\_max}$ from the control port 44 to the drain port 47 is allowed. Intermediate these two values of I there exists a current, $I_0$ where no (or a minimum) of flow is allowed through the valve.

When the current $I_0$ is applied, the flow through the flow control valve 410 is prevented and hence the associated actuator is locked in position and is substantially unable to move from the position.

Referring to FIG. 3, the movement of the gear selector actuator is controlled in terms of velocity by the flow through both of the associated flow control valves 410. By using the control device to apply the current Io to the control input 414 of either or both of the flow control valves 410, it is possible for the control device to prevent or severely restrict movement of the associated actuator. This feature can be used when the control device wants to actuate an actuator but does not want to actuate the others. The control device causes a locking control signal to be sent to either one, or both of the flow control valves 410 controlling the actuators that are not to be actuated.

For instance consider the case of changing the gear selected on the input shaft 22 from first to third. When the control device 420 decides that a gear change from first to third is required, the control device 420 needs to actuate the actuator 402 associated with this gear pair. However the remaining actuators should not be actuated. The control device causes a control signal to be input to the control input 414 of the remaining flow control valves, i.e., to:

Valve $410_2$ associated with the actuator 406 and the gear pair Reverse/Second;

Valve $410_R$ associated with the actuator 406 and the gear pair Reverse/Second;

Valve $410_4$ associated with the actuator 404 and the gear pair Fourth/Sixth;

Valve $410_6$ associated with the actuator 404 and the gear pair Fourth/Sixth;

Valve $410_5$ associated with the actuator 408 and the gear pair Fifth/Seventh; and Valve $410_7$ associated with the actuator 408 and the gear pair Fifth/Seventh.

The control signal input to the control input 414 of the valves is the specific current $I_0$ as defined in the flow/current profile, for example that shown in FIG. 4.

This ensures that all of the actuators listed above are effectively locked in an immovable position. Should any of the valves 410 fail for any reason and try to allow flow to/from any of these actuators, the actuator will still be held in an effectively immovable position by virtue of the other valve associated with that actuator.

For example, if the valve $410_7$ fails in such a way as to allow maximum flow from its pressure port to its control port, the actuator 408 will still be effectively locked in position by virtue of the locking control signal applied to the valve $410_5$.

An actuator may be actively maintained in the locked position via feedback.

This is particularly useful in situations where valve tolerances mean that there is always a small amount of flow even when the current $I_0$ is applied. The control device 420 may be arranged to monitor the flow into or out of a flow control valve and to alter the current control signal appropriately to dynamically reduce and preferably prevent any flow that may occur.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For instance, the invention may be applied to gearbox technologies other than that described with reference to the drawings (e.g., automated manual transmissions AMTs), different configurations of hydraulic circuits, different type of valves (e.g., with different characteristics, but which still exhibit a point where a certain control signal effectively gives zero flow), etc. In practice, it may not be possible completely to prevent any flow of fluid into/out of the actuator. Therefore where the term "locked" or "zero flow" is used herein this is intended to cover situations where an actuator is effectively locked, although there may be some leakage flow resulting in some very small movements of the actuator.

I claim:

1. An apparatus for controlling a movement of a shift rail in an automatic gear transmission system, the apparatus comprising:
   a plurality of actuators each connected to an associated shift rail, said plurality of actuators including a first actuator and one or more remaining, actuators;
   a control device connected to said actuators for controlling said actuators with an electrical control signal, said control device being configured, when a first electrical control signal is sent to said first actuator for actuating said first actuator, to send a second electrical control signal to said one or more remaining actuators to cause said remaining actuators to be locked in position;
   wherein said actuators are controlled by a hydraulic valve and said remaining actuators are hydraulically locked in response to the second electrical control signal being applied to a control input of said hydraulic valve.

2. The apparatus according to claim 1, wherein said hydraulic valve is configured to effectively provide substantially no flow when the second electrical control signal is applied.

3. A method of controlling a movement of a shift rail in an automatic gear transmission system, the method which comprises the following method steps:
   providing a plurality of actuators each connected to an associated shift rail;
   controlling an actuation of the actuators with an electrical control signal, and, when a first electrical control signal is sent to a first of the actuators to actuate the first of the actuators, sending a second electrical control signal to the remaining actuators to cause the remaining actuators to be locked in position;
   controlling the actuators with a hydraulic valve; and
   hydraulically locking the remaining actuators with the second electrical control signal applied to a control input of a control valve of the actuators.

4. The method according to claim 3, wherein application of the second electrical control signal causes substantially zero flow of fluid though the control valve.

* * * * *